United States Patent Office 2,868,687
Patented Jan. 13, 1959

2,868,687

FUNGICIDAL AND BACTERICIDAL COMPOSITIONS

Carleton B. Scott, Pomona, Calif., assignor, by mesne assignments, to Collier Carbon and Chemical Corporation, a corporation of California No Drawing. Application January 30, 1956
Serial No. 562,035

5 Claims. (Cl. 167—22)

This invention relates to a novel chemical product having fungicidal and bactericidal properties, and to fungicidal and bactericidal compositions comprising the same as the essential active ingredient. Said product is formed by reaction between dimethyl tetrathiophosphoric acid $(CH_3S)_2P(S)SH$, and perchloromethyl mercaptan, $Cl_3CSCl$, in the presence of an acid acceptor. Said product takes the form of a viscous amber liquid distilling above 150° C. under 1 mm. pressure. Its structural formula, however, is not known with certainty, and it is accordingly described and claimed herein as a reaction product rather than as a chemical entity whose exact identity can only be speculative.

As stated, the new chemical product of the invention is obtained by reaction between dimethyl tetrathiophosphate and perchloromethyl mercaptan. The tetrathiophosphate reactant is conveniently prepared by reaction between phosphorus pentasulfide and methyl mercaptan, preferably with isolation of methyl trithiometaphosphate as intermediate product. Perchloromethyl mercaptan is obtained as a by-product in the manufacture of carbon tetrachloride. In preparing the present fungicidal product the reactants are preferably employed in equimolecular proportions, although an excess of either may be employed if desired. The reaction takes place readily at room temperature with the evolution of hydrogen chloride, and may conveniently be conducted at 25°–35° C., although temperatures as low as −10° C. and as high as 60° C. may be employed if desired. An acid acceptor, i. e., a material capable of absorbing or combining with hydrogen chloride, e. g., an organic base such as pyridine, trimethylamine, dimethylaniline, etc., is preferably provided to remove the hydrogen chloride from the sphere of reaction and prevent the establishment of equilibrium conditions, and an inert reaction medium such as benzene, toluene, etc. may be employed to assist in dissipating the exothermic heat of reaction. Completion of the reaction is indicated by heat no longer being evolved. Upon completion of the reaction, the product is recovered by filtering or distilling off the acid acceptor and the reaction medium; if desired, the product may be further purified by distilling off lower-boiling contaminants under vacuum.

*Example I*

One-half mole of dimethyl tetrathiophosphate was dissolved in 100 ml. of benzene and 100 ml. of trimethylamine. One-half mole of perchloromethyl mercaptan was then slowly added to the resulting mixture with stirring over a period of 1 hour, during which time the reaction temperature was maintained at about 25° C. by immersing the reaction vessel in an ice bath. As the reaction proceeded a white precipitate of trimethylamine hydrochloride gradually formed within the vessel. Upon completion of the reaction this precipitate was filtered off, and the filtrate was heated under vacuum to evaporate the benzene. The product obtained had the characteristics previously mentioned.

The fungicidal and bactericidal compositions of the present invention are prepared by combining the product obtained as described above with a liquid or solid inert carrier material in the conventional manner. Thus, the product may be dispersed in water with the aid of a dispersing agent to form a concentrate composition which is subsequently diluted with water to form a spray suitable for application to living plants, lumber, and other materials subject to fungus and bacteria attack. Alternatively, the product may be admixed with an inert solid diluent such as talc, starch, diatomaceous earth, aluminum silicate, etc. to form a dusting composition which can be employed as such or dispersed in an aqueous or oleaginous medium to form a spray. In general, any of the conventional formulation and application techniques may be employed in employing the present fungicidal and bactericidal product, and any of the various known wetting agents, spreaders, sticking agents, diluents, etc. may be employed in combination with such product. The latter is substantially nonphytotoxic and may be applied to living plants in relatively high concentrations. However, as will be apparent from the test data presented below, it is effective in very small quantities, and in the interests of economy it is usually applied at concentrations of the order of 50–1000 parts per million. Liquid concentrate compositions usually contain between about 1 and about 15 percent by weight of the active ingredients and sufficient of an emulsifying or dispersing agent to maintain the active ingredient uniformly dispersed in the liquid suspending medium. Solid concentrate compositions usually contain between about 5 and about 25 percent by weight of the active ingredient and, optionally, small amounts of spreading agents and other conventional adjuvants.

The following examples will illustrate the formulation of a number of fungicidal and bactericidal compositions comprising the present product as the primary toxic agent, but are not to be construed as limiting the invention.

*Example II*

| | Lbs. |
|---|---|
| Reaction product as prepared in Example I | 2.0 |
| Attapulgus clay | 2.5 |
| Aluminum silicate | 40.0 |
| Powdered blood albumen | 0.2 |

*Example III*

| | Lbs. |
|---|---|
| Reaction product prepared as in Example I | 2.5 |
| Water | 50.0 |
| Powdered blood albumen | 0.25 |

The reaction product and blood albumen are added to the water, and the mixture is then passed through a colloid mill or high speed blender to obtain a concentrate composition which can be diluted 1000:1 with water to obtain a fungicidal spray for application to living plants.

*Example IV*

| | Lbs. |
|---|---|
| Reaction product prepared as in Example I | 0.5 |
| Benzene | 1.0 |
| Non-phytotoxic spray oil | 4000.0 |

This composition is suitable as a tree spray.

*Example V*

| | Lbs. |
|---|---|
| Reaction product prepared as in Example I | 10.0 |
| Kerosene extract oil | 150.0 |

This composition is suitable for impregnating lumber.

Example VI

|  | Lbs. |
|---|---|
| Reaction product prepared as in Example I | 2.5 |
| Water | 50.0 |
| Commercial spreading agent | 0.5 |
| Commercial sticking agent | 0.5 |

The ingredients are mixed in a colloid mill and thereafter diluted with 1200 gallons of water to obtain a spray composition containing about 250 parts per million of the active ingredient.

In order to demonstrate the fungicidal activity of the present product, the following test procedure is employed: A 2.5 gram sample of the material to be tested and 2 drops of a non-ionic dispersing agent ("Triton X-171" (polyethylene glycol phenyl iso-octyl ether) manufactured by Rohm and Haas Co.) is added to enough distilled water to make 100 grams and the solution is homogenized for 3 minutes in a high-speed blender. With the blender still operating, 3 grams of the liquid are removed therefrom and stirred into 75 grams of liquid potato dextrose agar at 45° C., and the agar is transferred to a Petri dish. The agar so prepared contains 1000 p. p. m. of the material to be tested. If lower concentrations are to be tested, e. g., 10 or 100 p. p. m, 1-gram portion of the concentrate composition in the blender are diluted with agar accordingly. The agar is allowed to cool to room temperature, whereupon it solidifies, and a ½" disk of the test fungus innoculum is placed on the surface of the agar. The innoculated agar is incubated for two days, after which the extent of the fungus growth is measured, and the percent inhibition of fungus growth is calculated by the formula:

$$100 - \frac{\text{growth on test sample}}{\text{growth on blank}} \times 100$$

The following tabulation presents inhibition values obtained by subjecting the present product to the foregoing test procedure employing a variety of test organisms.

| Test Organism | Percent Inhibition | |
|---|---|---|
|  | at 100 p. p. m. | at 1,000 p. p. m. |
| R. solani | 71.5 | 100 |
| S. rolfsii | 83.4 | 100 |
| P. cinnamomi | 90.0 | 100 |
| P. ultimum | 100.0 | 100 |
| S. sclerctiorum | 51.3 | 100 |
| S. fructicola | 91.4 | 100 |
| B. cinerea | 82.8 | 100 |
| A. solani | 57.2 | 100 |
| Average of all Organisms | 78.4 | 100 |

When the commercially available fungicides, "Captan" (N - (trichloromethylthio) - 1,2,3,6 - tetrahydrophthalamide), "PCNB" (pentachloronitrobenzene), "Phygon" (2,3-dichloro-1,4-naphthaquinone), and "Fermate" (ferric dimethyldithiocarbamate) were subjected to the foregoing test, the average inhibition values for the 8 test organisms were 74, 74, 59 and 55 percent, respectively, at a concentration of 100 p. p. m. and 90, 91, 83 and 96 percent, respectively, at a concentration of 1000 p. p. m. Thus, the present compositions compare very favorably with the best of the present-day commercial fungicides.

In testing the present product for bactericidal action, the concentrate solution is added to a standard culture medium consisting of potato dextrose agar, yeast extract, peptone, and calcium carbonate to give the desired concentration, and the medium is innoculated with the test organism. After incubation for 7 days the medium is examined for bacterial growth. The following results were obtained with the present product.

| Test Organism | Bacterial Growth | |
|---|---|---|
|  | at 100 p. p. m. | at 1,000 p. p. m. |
| Erwinia carotovora | Moderate | none. |
| Pseudomonus syringae | do | Do. |
| Agrobacterium tumefaciens | do | Do. |
| Xanthomomas juglandis | None | Do. |

The commercial fungicides "PCNB" and "Phygon" referred to above inhibited the growth of only one of the four test organisms at 1000 p. p. m.

Other modes of applying the principle of my invention may be employed instead of those explained, change being made as regards the materials or methods employed, provided the composition stated by any of the following claims, or the equivalent of such stated composition, be obtained.

I, therefore, particularly point out and distinctly claim as my invention:

1. The method of preventing and controlling the growth of fungi and bacteria on plant materials which comprises applying thereto an effective fungicidal and bactericidal amount of the product of reaction between substantially equimolecular amounts of dimethyl tetrathiophosphate and perchloromethyl mercaptan at a reaction temperature between about —10° C. and about 60° C., said product being a viscous amber liquid distilling above about 150° C. under 1 millimeter pressure.

2. The method of preventing and controlling the growth of fungi and bacteria on plant materials which comprises applying thereto an effective fungicidal and bactericidal amount of a composition comprising, as the essential active ingredient, the product of reaction between substantially equimolecular amounts of dimethyl tetrathiophosphate and perchloromethyl mercaptan at a reaction temperature between about —10° C. and about 60° C., said product being a viscous amber liquid distilling above about 150° C. under 1 millimeter pressure, and an inert pesticidal adjuvant as a carrier for said active ingredient.

3. A method as defined by claim 2 wherein the said carrier comprises water and a sufficient amount of a dispersing agent to maintain the said active ingredient dispersed in said water.

4. A method as defined by claim 2 wherein the said carrier material comprises a particular solid.

5. A method as defined by claim 3 wherein said composition contains between about 100 and about 1000 parts per million of the said active ingredient.

References Cited in the file of this patent

UNITED STATES PATENTS 2,759,010    Lorenz _____ Aug. 14, 1956

UNITED STATES PATENT OFFICE
CERTIFICATE OF CORRECTION

Patent No. 2,868,687                             January 13, 1959

Carleton B. Scott

It is hereby certified that error appears in the printed specification of the above numbered patent requiring correction and that the said Letters Patent should read as corrected below.

Column 2, line 20, for "nonphytotoxic" read -- non-phytotoxic --; line 27, for "ingredients" read -- ingredient --; column 4, line 56, for "particular" read -- particulate --.

Signed and sealed this 5th day of May 1959.

(SEAL)
Attest:

KARL H. AXLINE

Attesting Officer

ROBERT C. WATSON
Commissioner of Patents